(12) United States Patent
Yamazaki

(10) Patent No.: US 10,199,971 B2
(45) Date of Patent: Feb. 5, 2019

(54) MOTOR CONTROLLER, FLUX COMMAND GENERATOR, AND METHOD FOR GENERATING FLUX COMMAND

(71) Applicant: Kabushiki Kaisha Yaskawa Denki, Kitakyushu-shi (JP)

(72) Inventor: Akira Yamazaki, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/176,281

(22) Filed: Jun. 8, 2016

(65) Prior Publication Data

US 2016/0373043 A1  Dec. 22, 2016

(30) Foreign Application Priority Data

Jun. 18, 2015  (JP) .................. 2015-123275

(51) Int. Cl.
| | |
|---|---|
| *H02P 21/06* | (2016.01) |
| *H02P 21/22* | (2016.01) |
| *H02P 21/00* | (2016.01) |
| *H02P 21/20* | (2016.01) |
| *H02P 27/08* | (2006.01) |

(52) U.S. Cl.
CPC ............. *H02P 21/22* (2016.02); *H02P 21/00* (2013.01); *H02P 21/20* (2016.02); *H02P 27/08* (2013.01); *Y02P 80/116* (2015.11)

(58) Field of Classification Search
CPC .... H02P 21/0035; H02P 21/06; H02P 21/146; H02P 6/183; G05B 19/404; G05B 19/19; G05B 19/33; G05B 11/42
USPC ............... 318/400.02, 609, 610, 400.06, 632
See application file for complete search history.

(56) References Cited

U.S. PATENT DOCUMENTS

| | | | | |
|---|---|---|---|---|
| 6,069,467 A | * | 5/2000 | Jansen ..................... | H02P 6/183 318/801 |
| 6,137,258 A | * | 10/2000 | Jansen ..................... | H02P 6/185 318/802 |
| 7,808,203 B2 | * | 10/2010 | Tomigashi ................ | H02P 6/18 318/721 |
| 7,852,039 B2 | * | 12/2010 | Kinpara .................. | H02P 21/14 318/720 |

(Continued)

FOREIGN PATENT DOCUMENTS

| | | |
|---|---|---|
| CN | 102439842 A | 5/2012 |
| EP | 1 748 550 A1 | 1/2007 |

(Continued)

OTHER PUBLICATIONS

Extended European Search Report dated Nov. 8, 2016 in Patent Application No. 16173085.8.

(Continued)

*Primary Examiner* — Rina Duda
(74) *Attorney, Agent, or Firm* — Oblon, McClelland, Maier & Neustadt, L.L.P.

(57) ABSTRACT

A motor controller includes a driver, a current detector, and a command generator. The driver is configured to drive a power converter based on a flux command on which an exploration signal is superimposed. The current detector is configured to detect an output current output from the power converter that has been driven by the driver. The command generator is configured to generate the flux command so as to reduce a current component, among current components included in the output current detected by the current detector, that corresponds to the exploration signal.

13 Claims, 7 Drawing Sheets

(56) References Cited

U.S. PATENT DOCUMENTS

| | | | |
|---|---|---|---|
| 7,893,639 B2* | 2/2011 | Tomigashi | H02P 6/18 318/400.21 |
| 8,384,338 B2* | 2/2013 | Lu | H02P 21/16 318/490 |
| 2005/0194924 A1 | 9/2005 | Satake et al. | |
| 2008/0191656 A1 | 8/2008 | Satake et al. | |
| 2009/0261774 A1 | 10/2009 | Yuuki et al. | |
| 2012/0091941 A1 | 4/2012 | Hong | |
| 2012/0181970 A1 | 7/2012 | Yuuki et al. | |
| 2012/0268046 A1 | 10/2012 | Yamazaki et al. | |
| 2013/0334991 A1 | 12/2013 | Yuuki et al. | |
| 2014/0184133 A1 | 7/2014 | Yuuki et al. | |
| 2015/0137720 A1 | 5/2015 | Kobayashi et al. | |
| 2015/0311846 A1 | 10/2015 | Araki et al. | |

FOREIGN PATENT DOCUMENTS

| | | |
|---|---|---|
| EP | 2 048 772 A1 | 4/2009 |
| JP | 1-291687 A | 11/1989 |
| JP | 7-143794 A | 6/1995 |
| JP | 2005-253258 A | 9/2005 |
| JP | 2009-124811 A | 6/2009 |
| JP | 2012-120429 A | 6/2012 |
| JP | 2012-228083 A | 11/2012 |
| JP | 2014-090626 A | 5/2014 |
| WO | WO 2014/057575 A1 | 4/2014 |

OTHER PUBLICATIONS

Office Action dated Dec. 20, 2016 in Japanese Patent Application No. 2015-123275 (with unedited computer generated English translation).

Office Action dated Mar. 12, 2018, in Chinese Patent Application No. 201610417304.7 (with English-language translation).

Office Action dated Aug. 6, 2018, in Chinese Patent Application No. 201610417304.7 w/English-language translation (16 pages).

Office Action dated Sep. 13, 2013, in European Patent Application No. 16 173 085.8-1202 (3 pages).

* cited by examiner

| Status | Flux $\varphi$ increases | Flux $\varphi$ decreases | Relationship between flux $\varphi$ and current $i_{mh}$ |
|---|---|---|---|
| A | Current $i_{mh}$ increases | Current $i_{mh}$ decreases | $\phi$ <br> $i_{mh}$ |
| B | $\partial i_{mh} / \partial \phi_h \approx 0$ | | $\phi$ <br> $i_{mh}$ |
| C | Current $i_{mh}$ decreases | Current $i_{mh}$ increases | $\phi$ <br> $i_{mh}$ |

MOTOR CONTROLLER, FLUX COMMAND GENERATOR, AND METHOD FOR GENERATING FLUX COMMAND

CROSS-REFERENCE TO RELATED APPLICATIONS

The present application claims priority under 35 U.S.C. § 119 to Japanese Patent Application No. 2015-123275, filed Jun. 18, 2015. The contents of this application are incorporated herein by reference in their entirety.

BACKGROUND

Field of the Invention

The embodiments disclosed herein relate to a motor controller, a flux command generator, and a method for generating a flux command.

Discussion of the Background

In the driving of motors, some motor controllers generate a flux command to reduce the amount of current relative to torque that has been generated. Japanese Unexamined Patent Application Publication No. 2005-253258 and Japanese Unexamined Patent Application Publication No. 2012-120429 disclose generating a flux command based on the rotational speed of the motor. Japanese Unexamined Patent Application Publication No. 2005-253258 and Japanese Unexamined Patent Application Publication No. 2014-090626 disclose generating a flux command based on a torque current command.

SUMMARY

According to one aspect of the present disclosure, a motor controller includes a driver, a current detector, and a command generator. The driver is configured to drive a power converter based on a flux command on which an exploration signal is superimposed. The current detector is configured to detect an output current output from the power converter that has been driven by the driver. The command generator is configured to generate the flux command so as to reduce a current component, among current components included in the output current detected by the current detector, that corresponds to the exploration signal.

According to one aspect of the present disclosure, a flux command generator includes a current detector and a command generator. The current detector is configured to detect an output current output from a power converter that is driven based on a flux command on which an exploration signal is superimposed. The command generator is configured to generate the flux command so as to reduce a current component, among current components included in the output current detected by the current detector, that corresponds to the exploration signal.

According to the aspect of the present disclosure, a method for generating a flux command includes detecting an output current output from a power converter that is driven based on a flux command on which an exploration signal is superimposed. The flux command is generated so as to reduce a current component that is included in the output current and that corresponds to the exploration signal.

BRIEF DESCRIPTION OF THE DRAWINGS

A more complete appreciation of the present disclosure, and many of the attendant advantages thereof will be readily obtained as the same becomes better understood by reference to the following detailed description when considered in connection with the accompanying drawings, wherein.

DESCRIPTION OF THE EMBODIMENTS

In the following description, a motor controller, a flux command generator, and a method for generating a flux command according to embodiments will be described in detail by referring to the accompanying drawings. It is noted that the following embodiments are provided for exemplary purposes only, not for limiting purposes.

1. Motor Controller

Figure 1:
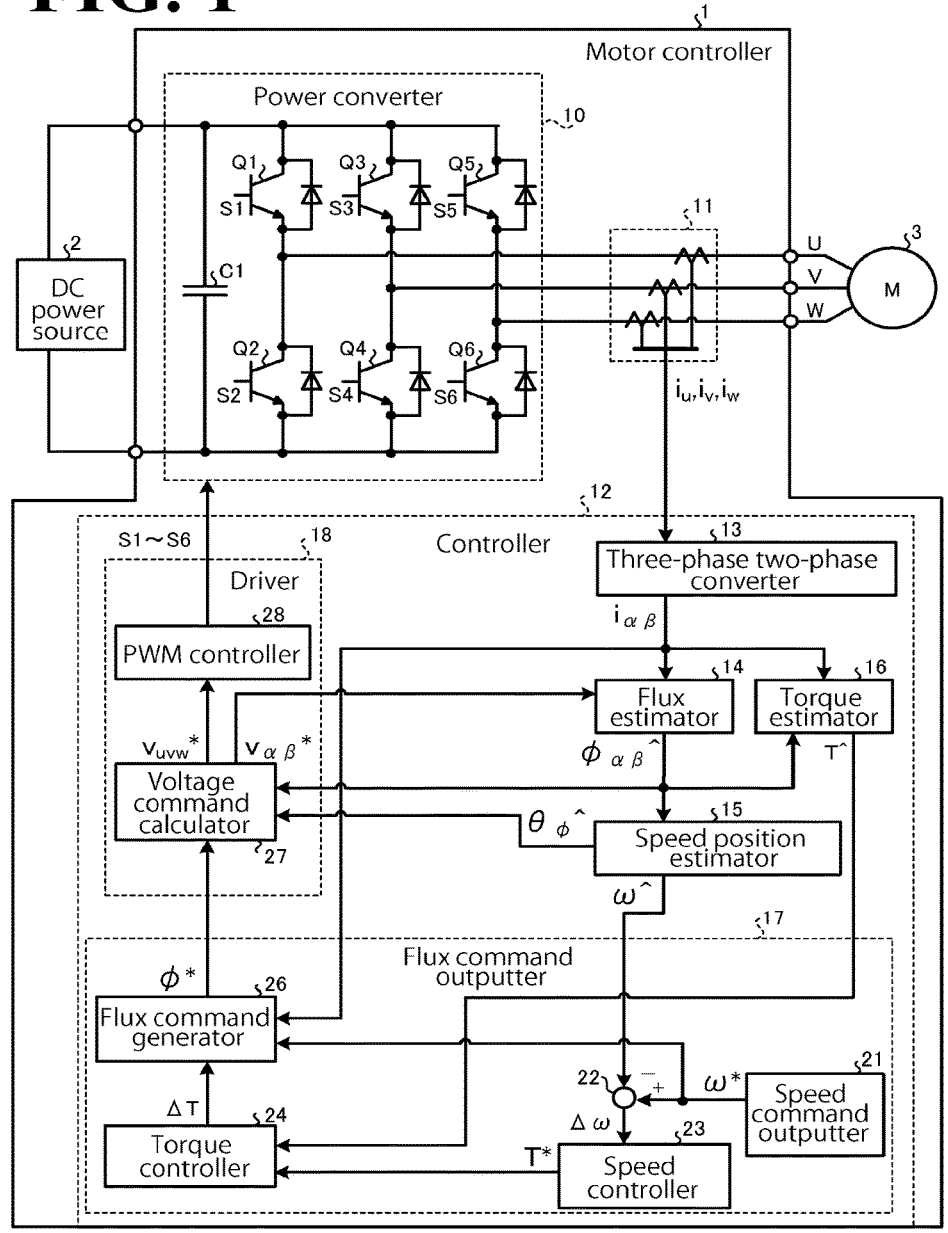
FIG. 1 is a diagram illustrating an exemplary configuration of a motor controller according to an embodiment.

FIG. 1 is a diagram illustrating an exemplary configuration of a motor controller 1 according to this embodiment. As illustrated in FIG. 1, the motor controller 1 is disposed between a direct-current (DC) power source 2 and a motor 3. The motor controller 1 includes a power converter 10, a current detector 11, and a controller 12. The motor controller 1 converts DC power supplied from the DC power source 2 into alternating-current (AC) power, and outputs the AC power to the motor 3 so as to control the motor 3.

While in FIG. 1 the motor controller 1 is disposed between the DC power source 2 and the motor 3, the motor controller 1 may be disposed between an AC power source and the motor 3. In this case, the motor controller 1 includes a converter that converts AC power supplied from the AC power source into DC power and that supplies the DC power to the power converter 10. The current detector 11 and the controller 12 are non-limiting examples of the flux command generator recited in the appended claims.

The power converter 10 includes a capacitor C1 and a plurality of switching elements Q1 to Q6. The switching elements Q1 to Q6 are connected to each other in a three-phase bridge configuration, and each of the switching elements Q1 to Q6 is anti-parallely connected with a protection-purpose diode. The switching elements Q1 to Q6 are semiconductor switching elements such as MOSFETs (Metal-Oxide-Semiconductor Field-Effect Transistors) and IGBTs (insulated Gate Bipolar Transistors). Other examples of the switching elements Q1 to Q6 include next generation semiconductor switching elements such as SiC and GaN.

The current detector 11 detects phase currents flowing through the U phase, the V phase, and the W phase between the power converter 10 and the motor 3. Specifically, the current detector 11 detects instantaneous values $i_u$, $i_v$, and $i_w$ of the output current output from the power converter 10 to the U phase, the V phase, and the W phase of the motor 3. The current detector 11 regards the instantaneous values $i_u$, $i_v$, and $i_w$ (hereinafter referred to as output currents $i_u$, $i_v$, and $i_w$) as detection currents and outputs the detection currents.

For each of the U phase, the V phase, and the W phase, the current detector 11 has a magneto-electric converting device such as a Hall effect device, shunt resistance, and a current transformer. Using the magneto-electric converting devices, the current detector 11 detects the output currents $i_u$, $i_v$, and $i_w$ (hereinafter occasionally collectively referred to as output current $i_o$).

In order to cause the motor 3 to rotate at a speed that is based on, for example, the speed command $\omega^*$, the controller 12 regards the output currents $i_u$, $i_v$, and $i_w$ as feedback values and uses the feedback values to generate Pulse-Width-Modulation (PWM) signals S1 to S6, which are respectively used to drive the switching elements Q1 to Q6 of the power converter 10. Then, the controller 12 outputs the PWM signals S1 to S6 to the power converter 10. This causes the power converter 10 to convert the DC power supplied from the DC power source 2 into AC power and output the AC power to the motor 3 so as to control the motor 3.

2. Controller 12

The controller 12 includes a three-phase two-phase converter 13, a flux estimator 14, a speed position estimator 15, a torque estimator 16, a flux command outputter 17, and a driver 18. The controller 12 includes a microcomputer and various circuits. The microcomputer includes a central processing unit (CPU), a read only memory (ROM), a random access memory (RAM), and input-output ports. The CPU of the microcomputer reads a program stored in the ROM and executes the program, and thus implements the control described later.

The functions of the three-phase two-phase converter 13, the flux estimator 14, the speed position estimator 15, the torque estimator 16, the flux command outputter 17, and the driver 18 are implemented by, for example, the above-described CPU when the CPU reads and executes the program. The three-phase two-phase converter 13, the flux estimator 14, the speed position estimator 15, the torque estimator 16, the flux command outputter 17, and the driver 18 each may partially or entirely be configured in hardware form.

The three-phase two-phase converter 13 converts the output currents $i_u$, $i_v$, and $i_w$ into two-orthogonal-axis components $\alpha$ and $\beta$ on a fixed coordinates system. In this manner, the three-phase two-phase converter 13 obtains $\alpha\beta$ axis current $i_{\alpha\beta}$. The $\alpha\beta$ axis current $i_{\alpha\beta}$ is a vector on an $\alpha\beta$ axis coordinates system, and includes $\alpha$ axis current $i_\alpha$ and $\beta$ axis current $i_\beta$. The $\alpha$ axis current $i_\alpha$ is an $\alpha$ axis component. The $\beta$ axis current $i_\beta$ is $\beta$ axis component.

The flux estimator 14 obtains estimated values of $\alpha\beta$ axis components of armature interlinkage flux $\phi$ (the estimated values will be hereinafter referred to as the $\alpha\beta$ axis estimated flux $\phi_{\alpha\beta}\hat{}$) based on, for example, the $\alpha\beta$ axis current $i_{\alpha\beta}$ and a the $\alpha\beta$ axis voltage command $v_{\alpha\beta}^*$. The armature interlinkage flux $\phi$ is a flux of the stator (primary side) of the motor 3. The $\alpha\beta$ axis estimated flux $\phi_{\alpha\beta}\hat{}$ includes $\alpha$ axis estimated flux $\phi_\alpha\hat{}$ and $\beta$ axis estimated flux $\phi_\beta\hat{}$. The $\alpha$ axis estimated flux $\phi_\alpha\hat{}$ is an $\alpha$ axis component. The $\beta$ axis estimated flux $\phi_\beta\hat{}$ is a $\beta$ axis component.

Examples of the flux estimator 14 include, but are not limited to, flux calculators disclosed in Japanese Unexamined Patent Application Publication No. 2015-12770 and Japanese Unexamined Patent Application Publication No. 2015-12771. The flux estimator 14 may have any other configuration insofar as the flux estimator 14 is capable of obtaining the $\alpha\beta$ axis estimated flux $\phi_{\alpha\beta}\hat{}$.

Based on the $\alpha\beta$ axis estimated flux $\phi_{\alpha\beta}\hat{}$ estimated by the flux estimator 14, the speed position estimator 15 obtains estimated position $\theta_\phi\hat{}$ and estimated speed $\omega\hat{}$. Specifically, the speed position estimator 15 obtains the estimated position $\theta_\phi\hat{}$ by, for example, performing inverse tangent calculation of the $\alpha\beta$ axis estimated flux $\theta_{\alpha\beta}\hat{}$. Then, the speed position estimator 15 obtains the estimated speed $\omega\hat{}$ by differentiating the estimated position $\theta_\phi\hat{}$. The estimated position $\theta_\phi\hat{}$ is an estimated value of the rotator position, $\theta_\phi$, of the motor 3, and the rotator position $\theta_\phi$ is the electrical angle of the rotator of the motor 3.

The torque estimator 16 calculates estimated torque $T\hat{}$ based on the $\alpha\beta$ axis current $i_{\alpha\beta}$ and the $\alpha\beta$ axis estimated flux $\phi_{\alpha\beta}\hat{}$. The estimated torque $T\hat{}$ is an estimated value of the output torque, $T$, of the power converter 10. The output torque $T$ is a torque generated on the motor 3 and may also be referred to as generated torque $T$. For example, the torque estimator 16 may obtain the estimated torque $T\hat{}$ by solving the equation: $T\hat{}=(\phi_\alpha\hat{}\times i_\beta-\phi_\beta\hat{}\times i_\alpha)\times(3/2)\times(P_n/2)$. As used in the equation, "$P_n$" denotes the number of poles of the motor 3.

The flux command outputter 17 generates a flux command $\phi^*$ based on the $\alpha\beta$ axis current $i_{\alpha\beta}$, the estimated speed $\omega\hat{}$, and the estimated torque $T\hat{}$. In order to drive the power converter 10, the driver 18 generates the PWM signals S1 to S6 based on the estimated position $\theta_\phi\hat{}$, the flux command $\phi^*$, and the $\alpha\beta$ axis estimated flux $\phi_{\alpha\beta}\hat{}$.

The PWM signals S1 to S6 respectively control the switching elements Q1 to Q6 of the power converter 10 between ON and OFF so as to cause the power converter 10 to output U phase, V phase, and W phase voltages that are based on the flux command $\phi^*$. In this manner, the rotation of the motor 3 is controlled. The power converter 10 may be equipped with an amplifier circuit that amplifies the PWM signals S1 to S6 and that outputs the amplified PWM signals respectively to the switching elements Q1 to Q6.

The flux command outputter 17 includes a speed command outputter 21, a subtractor 22, a speed controller 23, a torque controller 24, and a flux command generator 26. The speed command outputter 21 outputs the speed command $\omega^*$. The speed command $\omega^*$ is a target value of the rotational speed, $\omega$, of the rotator of the motor 3. The rotational speed $\omega$ is electrical angular speed.

The subtractor 22 subtracts the estimated speed $\omega\hat{}$ from the speed command $\omega^*$ to obtain speed deviation $\Delta\omega$. In order to make the speed deviation $\Delta\omega$ zero, the speed controller 23 performs PI (proportional integration) control with respect to the speed deviation $\Delta\omega$, and generates a torque command $T^*$.

The torque controller 24 obtains torque deviation $\Delta T$ based on the torque command $T^*$ and the estimated torque $T\hat{}$. For example, the torque controller 24 calculates the difference between the torque command $T^*$ and the estimated torque $T\hat{}$, and regards the difference as the torque deviation $\Delta T$ and outputs the torque deviation $\Delta T$.

Based on the $\alpha\beta$ axis current $i_{\alpha\beta}$, the torque deviation $\Delta T$, and the speed command $\omega^*$, the flux command generator 26 obtains the flux command $\phi^*$ so as to perform Maximum-Torque-Per-Ampere (MTPA) control. The MTPA control is to make the current through the motor 3 minimal relative to the torque of the motor 3. The flux command $\phi^*$ is a target value of the armature interlinkage flux $\phi$ of the motor 3. A configuration of the flux command generator 26 will be detailed later.

The driver 18 includes a voltage command calculator 27 and a PWM controller 28. The voltage command calculator 27 generates a three-phase voltage command $v_{uvw}{}^*$ and the αβ axis voltage command $v_{\alpha\beta}{}^*$ based on the flux command $\phi^*$ and the αβ axis estimated flux $\phi_{\alpha\beta}{}^{\wedge}$. The three-phase voltage command $v_{uvw}{}^*$ includes a voltage command $v_u{}^*$ of the U phase, a voltage command $v_v{}^*$ of the V phase, and a voltage command $v_w{}^*$ of the W phase. A αβ axis voltage command $v_{\alpha\beta}{}^*$ includes an α axis voltage command $v_{\alpha}{}^*$ and a β axis voltage command $v_{\beta}{}^*$. The α axis voltage command $v_{\alpha}{}^*$ is an α axis component. The β axis voltage command $v_{\beta}{}^*$ is a β axis component.

For example, the voltage command calculator 27 solves the following Formulae (1) and (2) to convert the flux command $\phi^*$ into αβ axis flux command $\phi_{\alpha\beta}{}^*$. The αβ axis flux command $\phi_{\alpha\beta}{}^*$ includes an α axis flux command $\phi_{\alpha}$ and a β axis flux command $\phi_{\beta}{}^*$. The α axis flux command $\phi_{\alpha}{}^*$ is an α component of the flux command $\phi^*$ on a αβ axis coordinates system. The β axis flux command $\phi_{\beta}{}^*$ is a β component of the flux command $\phi^*$.

$$\phi_{\alpha}{}^*=\phi^*\times\cos\theta_{\phi}{}^{\wedge} \quad (1)$$

$$\phi_{\beta}{}^*=\phi^*\times\sin\theta_{\phi}{}^{\wedge} \quad (2)$$

The voltage command calculator 27 obtains the three-phase voltage command $v_{uvw}{}^*$ based on the αβ axis flux command $\phi_{\alpha\beta}{}^*$, the αβ axis estimated flux $\phi_{\alpha\beta}{}^{\wedge}$, and the estimated position $\theta_{\phi}{}^{\wedge}$.

For example, in order to make zero the deviation, $\Delta\phi_{\alpha}$, between the α axis flux command $\phi_{\alpha}{}^*$ and the α axis estimated flux $\phi_{\alpha}{}^{\wedge}$, the voltage command calculator 27 performs, for example, PI (proportional integration) control with respect to the deviation $\Delta\phi_{\alpha}$. In this manner, the voltage command calculator 27 obtains the α axis voltage command $v_{\alpha}$. Also, in order to make zero the deviation, $\Delta\phi_{\beta}$, between the β axis flux command and the β axis estimated flux $\phi_{\beta}{}^{\wedge}$, the voltage command calculator 27 performs, for example, PI control with respect to the deviation $\Delta\phi_{\beta}$. In this manner, the voltage command calculator 27 obtains the β axis voltage command $v_{\beta}{}^*$.

Also, the voltage command calculator 27 converts the α axis voltage command $v_{\alpha}{}^*$ and the β axis voltage command $v_{\beta}{}^*$ into components on a d-q axis coordinates system that rotate in a synchronous manner with the estimated position $0_{\phi}{}^{\wedge}$. In this manner, the voltage command calculator 27 obtains a d-axis voltage command $v_d{}^*$ and a q-axis voltage command $v_q$. Based on the d-axis voltage command $v_d{}^*$ and the q-axis voltage command $v_q$, the voltage command calculator 27 solves the following Formulae (3) and (4) to obtain voltage amplitude Vm and phase θa.

$$Vm=\sqrt{v_d{}^2+v_q{}^2} \quad (3)$$

$$\theta a=\tan^{-1}(v_q/v_d) \quad (4)$$

The voltage command calculator 27 adds the estimated position $\theta_{\phi}{}^{\wedge}$ to the phase θa so as to obtain voltage phase θ. Then, the voltage command calculator 27 solves the following Formulae (5) to (7) to obtain the three-phase voltage command $v_{uvw}{}^*$.

$$v_u^* = Vm\times\cos(\theta) \quad (5)$$

$$v_v^* = Vm\times\cos\left(\theta-\frac{2}{3}\pi\right) \quad (6)$$

$$v_w^* = Vm\times\cos\left(\theta-\frac{4}{3}\pi\right) \quad (7)$$

The PWM controller 28 generates the PWM signals S1 to S6 based on the three-phase voltage command $v_{uvw}{}^*$ and outputs the PWM signals S1 to S6 to the power converter 10. This causes the power converter 10 to output to the motor 3 the voltage commands $v_u{}^*$, $v_v{}^*$, and $v_w{}^*$ of the U phase, the V phase, and the W phase. The voltage commands $v_u{}^*$, $v_v{}^*$, and $v_w{}^*$ respectively correspond to the voltages $v_u$, $v_v$, $v_w$ of the U phase, the V phase, and the W phase. In a non-limiting embodiment, an amplifier circuit, not illustrated, may be provided between the PWM controller 28 and the switching elements Q1 to Q6 to amplify the PWM signals S1 to S6.

3. Flux Command Generator 26

Figure 2:
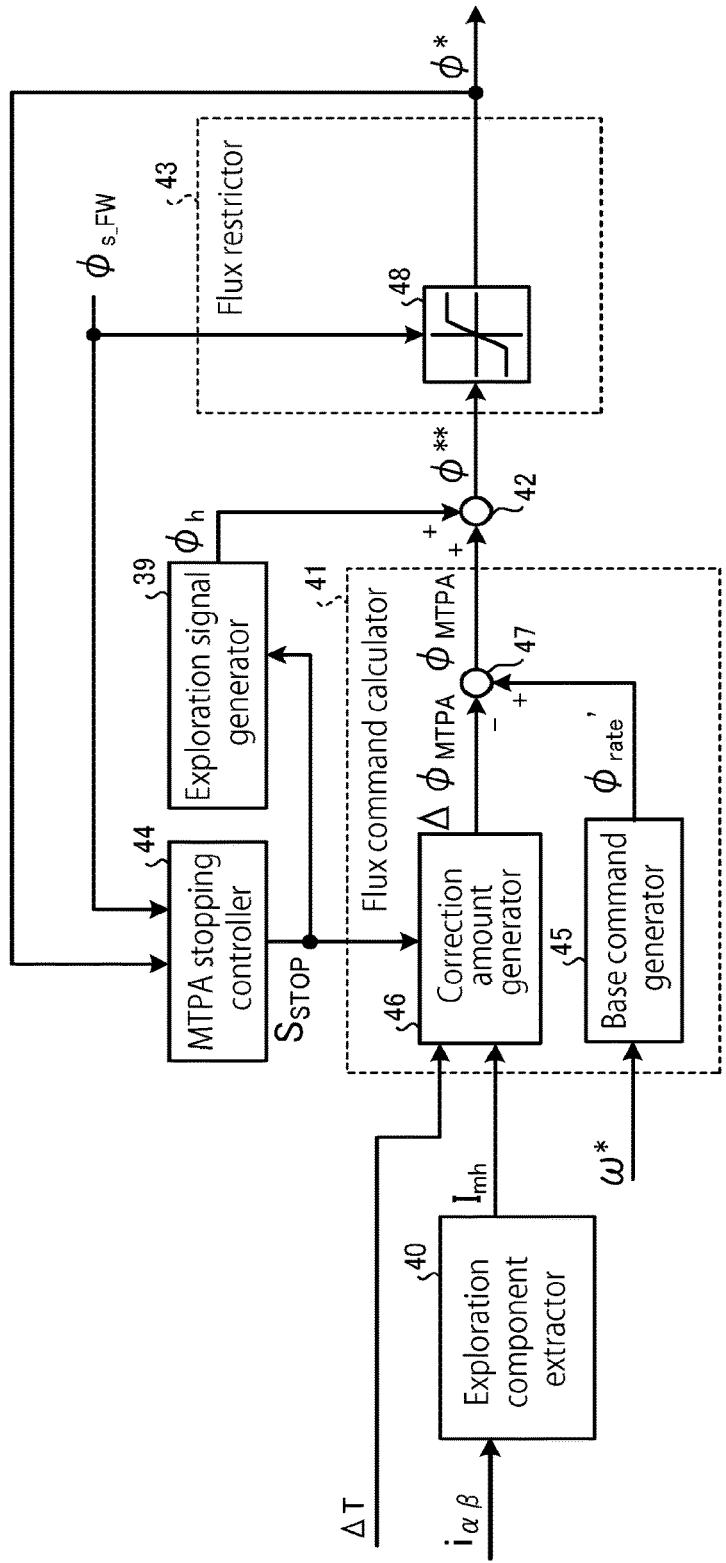
FIG. 2 is a diagram illustrating an exemplary configuration of a flux command generator.

FIG. 2 is a diagram illustrating an exemplary configuration of the flux command generator 26. As illustrated in FIG. 2, the flux command generator 26 includes an exploration signal generator 39, an exploration component extractor 40, a flux command calculator 41, an adder 42, a flux restrictor 43, and an MTPA stopping controller 44. The flux command generator 26 performs a calculation on an every calculation period Ts basis, for example.

The exploration signal generator 39 of the flux command generator 26 generates an exploration signal $\phi_h$. The exploration signal $\phi_h$ is to be superimposed on a flux command $\phi_{MTPA}$. The frequency of the exploration signal $\phi_h$ (hereinafter referred to as exploration signal frequency $\omega_h$) belongs to a frequency band suitable or tolerable for the motor controller 1 and the motor 3 and is set at a suitable value. A non-limiting example of the exploration signal frequency $\omega_h$ is a frequency that is not close to driving frequency ωo and that is higher than the driving frequency ωo. The driving frequency ωo is the frequency of the output voltage of the power converter 10.

The exploration signal generator 39 solves, for example, the following Formula (8) to obtain the exploration signal $\phi_h$. As used in Formula (8), "$K_h$" denotes the amplitude of the exploration signal $\phi_h$, that is, superimposition flux amplitude. A non-limiting example of "$K_h$" is a hundredth (1/100) of rated flux $\phi_{rate}$.

$$\phi_h=K_h\times\sin\omega_h t \quad (8)$$

Also, the exploration signal generator 39 is capable of regulating the exploration signal frequency $\omega_h$ based on the speed command ω*. For example, the exploration signal generator 39 may make the exploration signal frequency $\omega_h$ a frequency that is n times the speed command ω* (n is equal to or more than two).

The exploration component extractor 40 extracts the amplitude of current $i_{mh}$ (hereinafter referred to as amplitude $I_{mh}$) from the αβ axis current $i_{\alpha\beta}$. The current $i_{mh}$ is a current component that is included in the output currents $i_u$, $i_v$, and $i_w$ and that corresponds to the exploration signal $\phi_h$. For example, from the amplitude, $I_m$, of the αβ axis current $i_{\alpha\beta}$, the exploration component extractor 40 extracts an amplitude that has a component of the same frequency and phase as the frequency and phase of the exploration signal $\theta_h$, and regards this amplitude as the amplitude $I_{mh}$.

The flux command calculator 41 generates the flux command $\phi_{MTPA}$ based on the amplitude $i_{mh}$, the torque deviation ΔT, and the speed command ω*. The flux command calculator 41 includes a base command generator 45, a correction amount generator 46, and a corrector 47.

The base command generator 45 generates a base flux command $\phi_{rate}'$. The base flux command $\phi_{rate}'$ (which is a non-limiting example of the base command recited in the appended claims) is a flux command that serves as a basis for the flux command $\phi^*$. The base flux command $\phi_{rate}'$ (which is a non-limiting example of the base command recited in the appended claims) is generated based on, for example, the rated flux $\phi_{rate}$. The correction amount generator 46 generates the flux correction amount $\Delta\phi_{MTPA}$. The corrector 47 subtracts the flux correction amount $\Delta\phi_{MTPA}$ from the base flux command $\phi_{rate}'$ to generate the flux command $\phi_{MTPA}$.

Figures 3, 4:
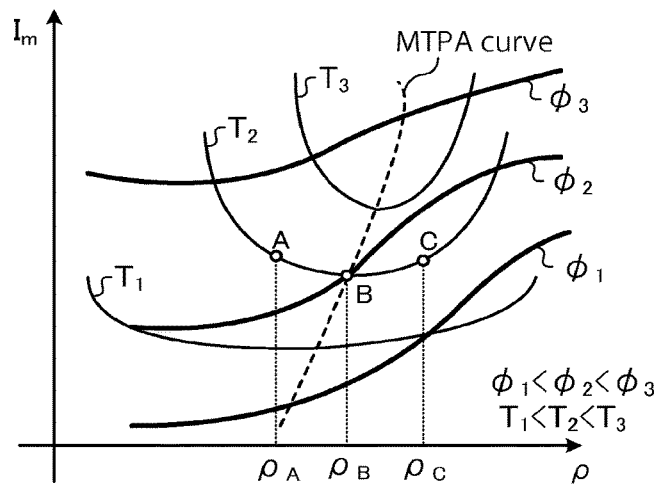
FIG. 3 is a graph illustrating a relationship among armature interlinkage flux, generated torque, current amplitude, and load angle.
FIG. 4 is a table illustrating a relationship between armature interlinkage flux and current.

The flux correction amount $\Delta\phi_{MTPA}$, which is generated by the flux command calculator 41, will be described. FIG. 3 is a graph illustrating a relationship among the armature interlinkage flux $\phi$, the generated torque T, the current amplitude $I_m$, and load angle $\rho$. The load angle $\rho$ is a current load angle from the d-axis, which is a flux axis. The current amplitude $I_m$ is the amplitude of the $\alpha\beta$ axis current $i_{\alpha\beta}$.

As illustrated in FIG. 3, the load angle $\rho$ and the current amplitude $I_m$ have a relationship that varies depending on the state of the armature interlinkage flux $\phi$ and the state of the generated torque T. For example, assume that $T=T_2$. In this case, when the load angle $\rho$ is at point B ($\rho=\rho_B$), the current amplitude $I_m$ is at its minimal. When the current amplitude $I_m$ is at its minimal, the armature interlinkage flux $\phi$ is $\phi_2$. When the load angle $\rho$ is at point A ($\rho=\rho_A$), the armature interlinkage flux $\phi$ exists in excess. When the load angle $\rho$ is at point C ($\rho=\rho_C$), there is a deficiency of the armature interlinkage flux $\phi$.

Here, assume that the exploration signal $\phi_h$ is superimposed on the armature interlinkage flux $\phi$ and that current $i_{mh}$ that has a component of the same frequency and phase as the frequency and phase of the exploration signal $\phi_h$ is extracted from the current amplitude $I_m$. In this case, the armature interlinkage flux $\phi$ and the current $i_{mh}$ with the load angle $\rho$ at point A, point B, and point C are as illustrated in FIG. 4. FIG. 4 is a table illustrating a relationship between the armature interlinkage flux $\phi$ and the current $i_{mh}$.

As illustrated in FIG. 4, when the armature interlinkage flux $\phi$ increases from point A, the current $i_{mh}$ increases. When the armature interlinkage flux $\phi$ decreases from point A, the current $i_{mh}$ decreases. When the armature interlinkage flux $\phi$ increases from point C, the current $i_{mh}$ decreases. When the armature interlinkage flux $\phi$ decreases from point C, the current $I_{mh}$ increases. When the armature interlinkage flux $\phi$ is at point B, the current $I_{mh}$ becomes zero.

Thus, by controlling the armature interlinkage flux $\phi$ to make the current $i_{mh}$ zero, the armature interlinkage flux $\phi$ can be made to follow high efficiency flux (points on the MTPA curve illustrated in FIG. 3). The flux command calculator 41 calculates the flux correction amount $\Delta\phi_{MTPA}$ to make the current $i_{mh}$ zero, and subtracts the flux correction amount $\Delta\phi_{MTPA}$ from the base flux command $\phi_{rate}'$ to generate the flux command $\phi_{MTPA}$. Thus, the generated flux command $\phi_{MTPA}$ is capable of performing MTPA control.

In a situation of voltage saturation, it may be difficult to generate a flux command $\phi_{MTPA}$ that is capable of performing MTPA control. In view of this situation, the flux command generator 26 determines whether a voltage saturation has occurred based on the deviation between limitation flux $\phi_{s\_FW}$ and the flux command $\phi^*$. When the flux command generator 26 has determined that a voltage saturation has occurred, the flux command generator 26 may limit flux command $\phi^{}$ to limitation flux $\phi_{s\_FW}$ so as to prevent the output voltage of the power converter 10 from exceeding a limitation voltage. When the flux command generator 26 has determined that a voltage saturation has occurred, the flux command generator 26** may stop the superimposition operation of the exploration signal $\phi_h$ and the MTPA estimation operation.

Referring back to FIG. 2, the flux command generator 26 will be further described. The adder 42 of the flux command generator 26 adds the exploration signal $\phi_h$ to the flux command $\phi_{MTPA}$ so as to generate the flux command $\phi^{}$. In this manner, the generated flux command $\phi^{}$ has the exploration signal $\phi_h$ superimposed on the flux command $\phi_{MTPA}$.

The flux command $\phi^{**}$ is output as the flux command $\phi^*$ through the flux restrictor 43. The flux restrictor 43 includes a limiter 48. The limiter 48 limits the flux command $\phi^*$ based on the limitation flux $\phi_{s\_FW}$.

For example, the limiter 48 refers to the limitation flux $\phi_{s\_FW}$, and when the flux command $\phi^{}$ is not in excess of limitation flux $\phi_{s\_FW}$, the limiter 48 regards the flux command $\phi^{}$ as the flux command $\phi^*$ and outputs the flux command $\phi^*$. When the flux command $\phi^{}$ is in excess of the limitation flux $\phi_{s\_FW}$, the limiter 48** limits the flux command i $\phi^*$ to or below a predetermined value.

When the flux command $\phi^{}$ is in excess of the limitation flux $\phi_{s\_FW}$, the limiter i 48** may limit the flux command $\phi^*$ to or below 10% of the rated flux $\phi_{rate}$. This configuration ensures that the flux command $\phi^*$ is limited in a voltage saturation situation.

The MTPA stopping controller 44 outputs a low-active stop command $S_{STOP}$ to the exploration signal generator 39 and the flux command calculator 41 when the deviation $\Delta\phi$ between the limitation flux $\phi_{s\_FW}$ and the flux command $\phi^*$ becomes equal to or less than the threshold $\phi_{STOP}$, which is set in advance. In a non-limiting embodiment, the stop command $S_{STOP}$ is $S_{STOP}=K_h \times K_b$, where $K_b$ is in the range of from 1 to 10.

Thus, the MTPA stopping controller 44 outputs a low-active stop command $S_{STOP}$ when the deviation $\Delta\phi$ between the limitation flux $\phi_{s\_FW}$ and the flux command $\phi^*$ becomes equal to or less than a predetermined level relative to the amplitude $K_h$ of the exploration signal $\phi_h$. This configuration ensures that in a voltage saturation situation, both the superimposition operation of the exploration signal $\phi_h$ and the MTPA estimation operation are terminated, causing the operation of generating the flux command $\phi^*$ to be terminated.

Thus, the flux command generator 26 superimposes the exploration signal $\phi_h$ on the flux command $\phi_{MTPA}$ so as to generate the flux command $\phi^*$; extracts from the current amplitude $I_m$ a component that is the same in frequency and phase as the exploration signal $\phi_h$; and generates the flux command $\phi_{MTPA}$ to make the extracted component zero.

This configuration enables the motor controller 1 according to this embodiment to control the motor with higher efficiency and without the need for knowing motor characteristics in advance. In the following description, a configuration of the flux command generator 26 will be described in more detail.

3. 1. Exploration Signal Generator 39

Figure 5:
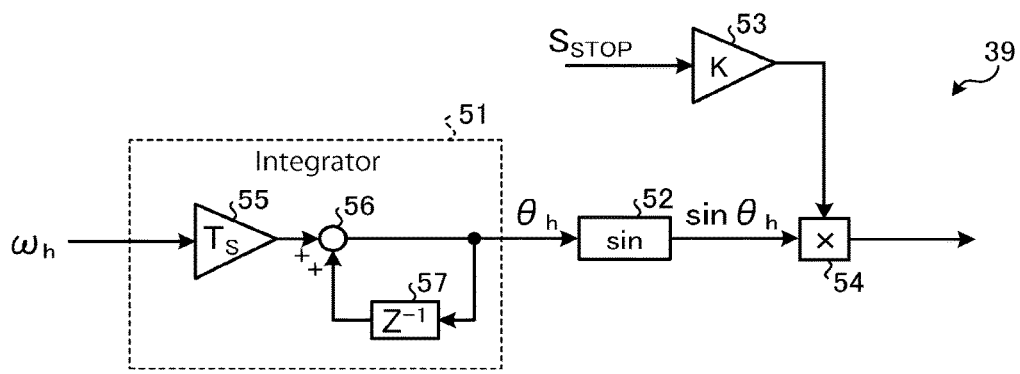
FIG. 5 is a diagram illustrating an exemplary configuration of an exploration signal generator.

FIG. 5 is a diagram illustrating an exemplary configuration of the exploration signal generator 39. As illustrated in FIG. 5, the exploration signal generator 39 includes an integrator 51, a sine calculator 52, an amplifier 53, and a multiplier 54. The integrator 51 integrates the exploration signal frequency $\omega_h$ to obtain exploration signal phase $\theta_h$.

The integrator 51 includes an amplifier 55, an adder 56, and a delayer 57. The amplifier 55 makes the exploration signal frequency $\omega_h$ Ts times higher. The adder 56 adds the result of the amplification performed by the amplifier 55 and the result of the delay operation by the delayer 57 to obtain the exploration signal phase $\theta_h$. The delayer 57 delays the exploration signal phase $\theta_h$ by one calculation period Ts.

The sine calculator 52 obtains $\sin \theta_h$ based on the exploration signal phase $\theta_h$. The amplifier 53 uses gain K to make the stop command $S_{STOP}$ K times bigger. The multiplier 54 multiplies $\sin \theta_h$ by the result of the amplification performed by the amplifier 53 to obtain the exploration signal $\phi_h$ (=K× $S_{STOP}$×$\sin \theta_h$). The gain K corresponds to "$K_h$" in Formula (8). A non-limiting example of the gain K is 1% to 100% of the rated flux $\phi_{rate}$.

3. 2. MTPA Stopping Controller 44

Figure 6:
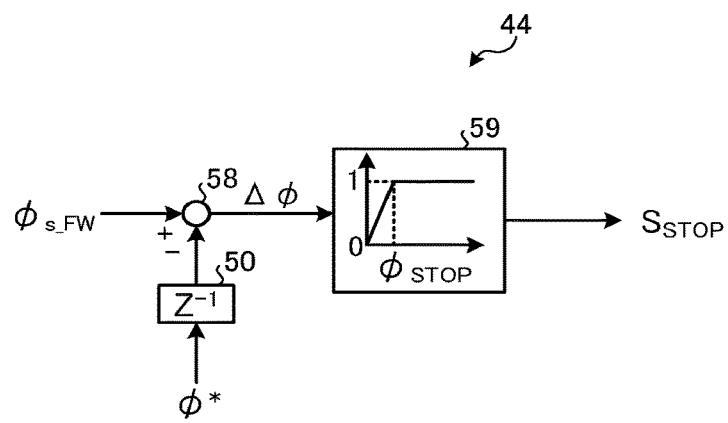
FIG. 6 is a diagram illustrating an exemplary configuration of an MTPA stopping controller.

Next, the MTPA stopping controller 44 will be described. FIG. 6 is a diagram illustrating an exemplary configuration of the MTPA stopping controller 44.

As illustrated in FIG. 6, the MTPA stopping controller 44 includes a delayer 50, a subtractor 58, and a stop signal outputter 59. The delayer 50 delays the flux command $\phi^*$ by one calculation period Ts. The subtractor 58 subtracts the flux command $\phi^*$ delayed by the delayer 50 from the limitation flux $\phi_{s\_FW}$ to obtain the deviation $\Delta\phi$ between the limitation flux $\phi_{s\_FW}$ and the flux command $\phi^*$. The stop signal outputter 59 outputs stop command $S_{STOP}$ that is based on the deviation $\Delta\phi$ between the limitation flux $\phi_{s\_FW}$ and the flux command $\phi^*$. For example, when the deviation $\Delta\phi$ is equal to or larger than threshold $\phi_{STOP}$, the stop signal outputter 59 sets $S_{STOP}$ at 1. When the deviation $\Delta\phi$ is equal to or smaller than the threshold $\phi_{STOP}$, the stop signal outputter 59 sets $S_{STOP}$ at 0.

In a non-limiting embodiment, When the deviation $\Delta\phi$ is smaller than the threshold $\phi_{STOP}$, the stop signal outputter 59 may output a stop command $S_{STOP}$ that becomes closer to "0" as the deviation $\Delta\phi$ decreases. This configuration prevents the stop command $S_{STOP}$ from alternating between "1" and "0" even if the deviation $\Delta\phi$ fluctuates around the threshold $\phi_{STOP}$.

3. 3. Base Command Generator 45

Figure 7:
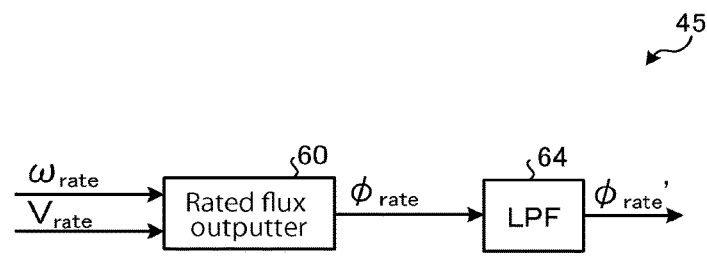
FIG. 7 is a diagram illustrating an exemplary configuration of a base command generator.

Next, a configuration of the base command generator 45 will be described. FIG. 7 is a diagram illustrating an exemplary configuration of the base command generator 45.

As illustrated in FIG. 7, the base command generator 45 includes a rated flux outputter 60 and a the lowpass filter (LPF) 64, and generates the base flux command $\phi_{rate}'$.

The rated flux outputter 60 calculates the rated flux $\phi_{rate}$ based on rated frequency $\omega_{rate}$ [rad/s] and rated voltage $V_{rate}$ [$V_{rms}$]. For example, the rated flux outputter 60 solves the following Formula (9) to obtain the rated flux $\phi_{rate}$.

$$\phi_{rate} = \frac{V_{rate} * \sqrt{2}}{2} / \omega_{rate} \tag{9}$$

As indicated in the following Formula (10), the rated frequency $\omega_{rate}$ is obtained based on the rated rotational frequency $N_{rate}$ of the motor 3 and the number of poles $P_n$ of the motor 3. The rated frequency $\omega_{rate}$ may be input through, for example, the input portion (not illustrated) of the motor controller 1. Information indicating the input rated frequency $\omega_{rate}$ is set in the controller 12. When the rated rotational frequency $N_{rate}$ and the number of poles $P_n$ are input through the input portion, the rated flux outputter 60 may obtain the rated frequency $\omega_{rate}$ based on the following Formula (10).

$$\omega_{rate} = \frac{N_{rate}}{60} \times 2\pi \times P_n \tag{10}$$

The rated voltage $V_{rate}$ is, for example, the rated voltage of the motor 3 or the rated voltage of the power converter 10. The rated voltage $V_{rate}$ may be input through, for example, the input portion (not illustrated) of the motor controller 1. Information indicating the input rated voltage $V_{rate}$ is set in the controller 12.

The lowpass filter 64 performs lowpass filter processing with respect to the rated flux $\phi_{rate}$ to obtain the base flux command $\phi_{rate}'$. Then, the lowpass filter 64 outputs the base flux command $\phi_{rate}'$. Performing primary delay processing such as this lowpass filter processing is for the purpose of eliminating or minimizing an excessive flow of output current of the power converter 10 at the time of activation.

3. 4. Correction Amount Generator 46

Figure 8:
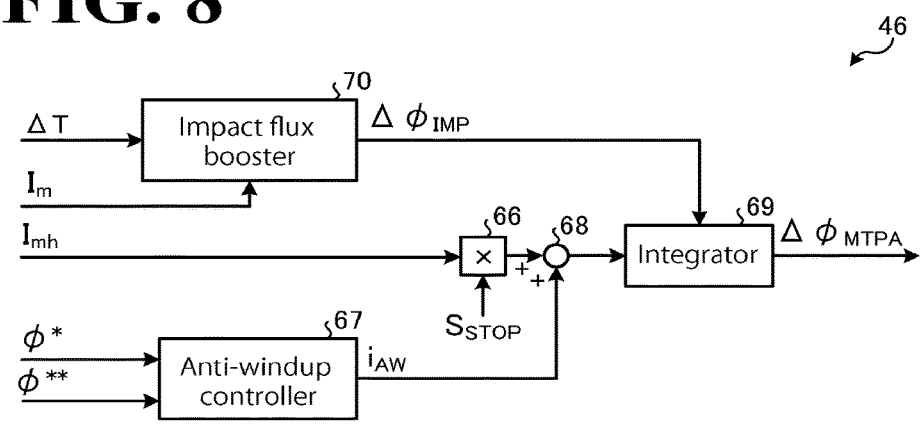
FIG. 8 is a diagram illustrating an exemplary configuration of a correction amount generator.

Next, the correction amount generator 46 will be described. FIG. 8 is a diagram illustrating an exemplary configuration of the correction amount generator 46.

As illustrated in FIG. 8, the correction amount generator 46 includes a multiplier 66, an anti-windup controller 67, an adder 68, and an integrator 69, and an impact flux booster 70.

The multiplier 66 multiplies the amplitude $I_{mh}$ of the current $i_{mh}$ by the stop command $S_{STOP}$. This causes the amplitude $I_{mh}$ of the current $I_{mh}$ to be output as it is from the multiplier 66 when the stop command $S_{STOP}$ is "1", for example. When the stop command $S_{STOP}$ is "0", the product of the multiplication performed by the multiplier 66 is zero, causing to stop the calculation performed by the correction amount generator 46 to obtain the flux correction amount $\Delta\phi_{MTPA}$.

When the MTPA stopping controller 44 has stopped the superimposition operation of the exploration signal $\phi_h$ and the MTPA estimation operation, the anti-windup controller 67 controls the output of the integrator 69 to match the deviation $\Delta\phi$ between the limitation flux $\phi_{s\_FW}$ and the flux command $\phi^*$. For example, the anti-windup controller 67 obtains the amount, $i_{AW}$, of current corresponding to the difference between the flux command $\phi^{**}$ and the flux command $\phi^*$ so as to control the output of the integrator 69 (the amount $i_{AW}$ of current will be hereinafter referred to as current $I_{AW}$).

The adder 68 adds the current $i_{AW}$ of the anti-windup controller 67 to the product of the multiplication performed by the multiplier 66. The integrator 69 integrates the sum of the addition performed by the adder 68 to generate flux correction amount $\Delta\phi_{MTPA}$.

Based on the torque deviation $\Delta T$ and the current amplitude $I_m$, the impact flux booster 70 outputs an impact flux boost adjustment value $\Delta\phi_{IMP}$. The impact flux boost adjustment value $\Delta\phi_{IMP}$ is used to rapidly change the flux correction amount $\Delta\phi_{MTPA}$ when there is an impact caused by an increase in load.

The integrator 69 is capable of adjusting the flux correction amount $\Delta\phi_{MTPA}$ based on the impact flux boost adjustment value $\Delta\phi_{IMP}$ of the impact flux booster 70. This causes the flux correction amount $\Delta\phi_{MTPA}$ to be rapidly changed when there is an impact caused by an increase in load. This, in turn, eliminates or minimizes out-of-synchronization phenomena caused by a deficiency in flux.

3. 5. Exploration Component Extractor 40 and Correction Amount Generator 46

Figure 9:
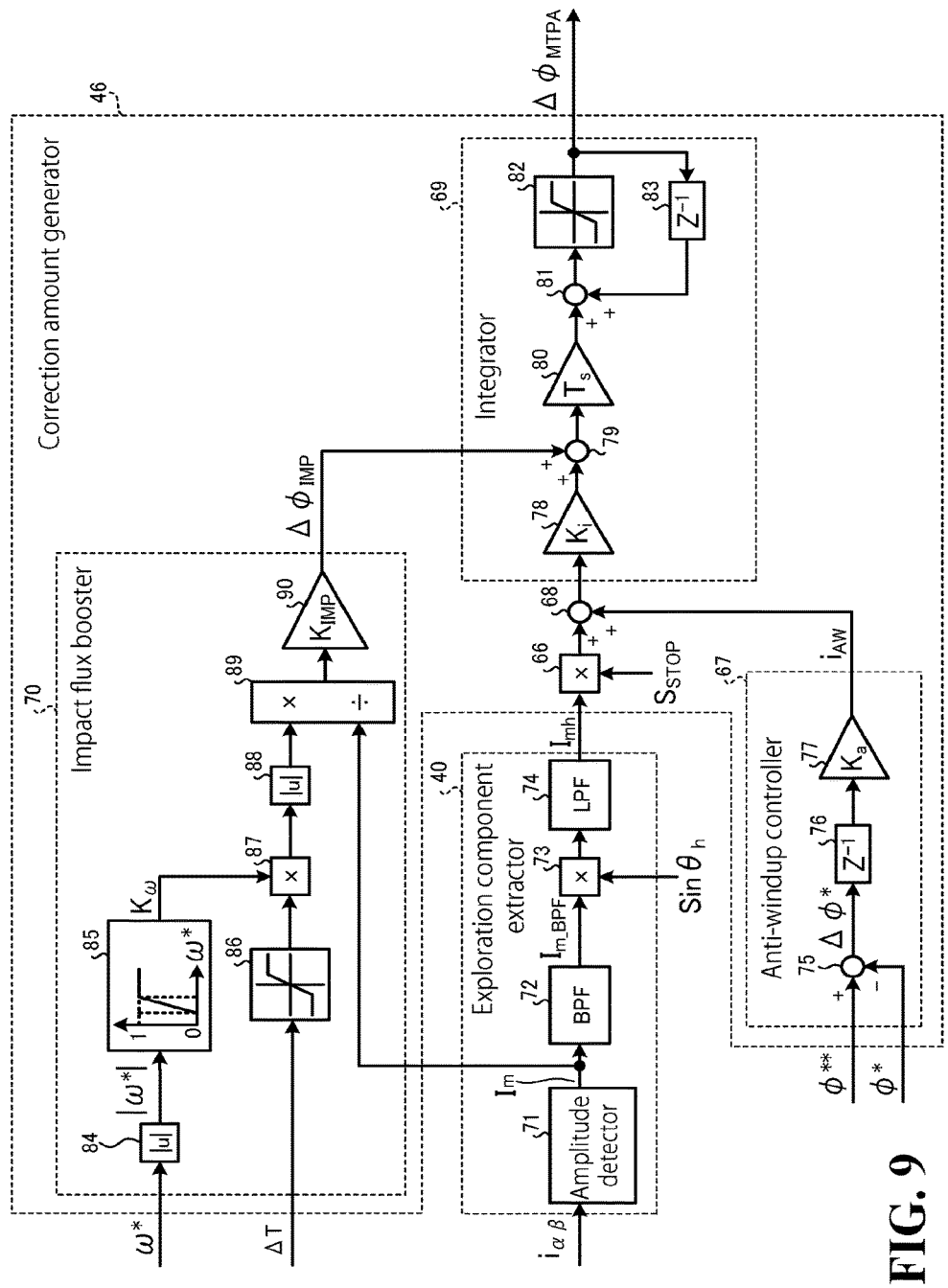
FIG. 9 is a diagram illustrating exemplary configurations of an exploration component extractor and the correction amount generator.

FIG. 9 is a diagram illustrating exemplary configurations of the exploration component extractor 40 and the correction amount generator 46. The exploration component extractor 40, the anti-windup controller 67, the integrator 69, and the impact flux booster 70 of the correction amount generator 46 will be described in this order.

3. 5. 1. Exploration Component Extractor 40

As illustrated in FIG. 9, the exploration component extractor 40 includes an amplitude detector 71, a BPF (bandpass filter) 72, a multiplier 73, and an LPF (lowpass filter) 74. The amplitude detector 71 calculates, for example, the square-sum square root of the αβ axis current $i_{\alpha\beta}$ included in the following Formula (11) so as to calculate the current amplitude $I_m$ of the αβ axis current $i_{\alpha\beta}$.

$$I_m = \sqrt{i_\alpha^2 + i_\beta^2} \quad (11)$$

The bandpass filter 72 performs bandpass filter processing with respect to the current amplitude $I_m$ to remove frequency components lower than the exploration signal frequency $\omega_h$ and frequency components higher than the exploration signal frequency $\omega_h$. In this manner, the bandpass filter 72 extracts current $I_{m\_BPF}$ from current amplitude $I_m$. The current $I_{m\_BPF}$ has α component of the same frequency as the exploration signal frequency $\omega_h$. In a non-limiting embodiment, the bandpass filter 72 may include a lowpass filter that removes frequency components higher than the exploration signal frequency $\phi_h$; and a highpass filter that removes frequency components lower than the exploration signal frequency $\omega_h$.

The multiplier 73 multiplies the current $I_{m\_BPF}$ by sin $\theta_h$. The lowpass filter 74 performs lowpass filter processing with respect to the product of the multiplication performed by the multiplier 73. In this manner, a DC component of the current $I_{mh}$ that has the same phase as the exploration signal phase $\theta_h$ is extracted from the current $I_{m\_BPF}$. The DC component of the current $i_{mh}$ extracted by the lowpass filter 74 is the amplitude $I_{mh}$ of the current $i_{mh}$. This processing is also referred to as heterodyne processing.

3. 5. 2. Anti-Windup Controller 67

The anti-windup controller 67 includes a subtractor 75, a delayer 76, and an amplifier 77. The subtractor 75 subtracts the flux command φ* from the flux command φ**. The delayer 76 delays the result Δφ* of the subtraction performed by the subtractor 75 by one calculation period Ts.

The amplifier 77 makes the delayed subtraction result Δφ* obtained by the delayer 76 $K_a$ times bigger so as to generate the current $I_{AW}$ for anti-windup control. The gain $K_a$ is a coefficient for converting flux to current and can be represented by, for example, the following Formula (12). As used in Formula (12), "$I_{rate}$" denotes the rated current of the motor 3, and "L" denotes the reactance of the motor 3.

$$K_a = \frac{1}{L} = \frac{I_{rate}}{\phi_{rate}} \quad (12)$$

When the flux command φ* is not limited by the flux restrictor 43, the flux command φ** as it is becomes the flux command φ* and is output from the flux restrictor 43. In this case, the flux command φ** is equal to the flux command φ*. Therefore, the current $i_{AW}$ output from the anti-windup controller 67 is zero.

When the flux command φ* is limited by the flux restrictor 43, the current $i_{AW}$ output from the anti-windup controller 67 is a current corresponding to the difference between the flux command φ** and the flux command φ*. In this case, an amount of current corresponding to the difference between the flux command φ** and the flux command φ* is added to the product of the multiplication performed by the multiplier 66.

3. 5. 3. Integrator 69

The integrator 69 includes amplifiers 78 and 80, adders 79 and 81, a limiter 82, and a delayer 83. The amplifier 78 makes the sum of the addition performed by the adder 68 $K_i$ times larger. Integration gain $K_i$ can be represented by the following Formula (13), for example. As used in Formula (13), $\omega_{MTPA}$ [rad/s] denotes the speed of MTPA control response, and a non-limiting example is 2π.

$$K_i = \omega_{MTPA} \times L = \omega_{MTPA} \times \frac{\phi_{rate}}{I_{rate}} \quad (13)$$

The adder 79 adds the impact flux boost adjustment value $\Delta\phi_{IMP}$ to the result of the amplification performed by the amplifier 78. The amplifier 80 makes the sum of the addition performed by the adder 79 Ts times larger. The adder 81 adds the flux correction amount $\Delta\phi_{MTPA}$ delayed by one calculation period Ts by the delayer 83 to the result of the amplification performed by the amplifier 80. The limiter 82 limits the sum of the addition performed by the adder 81 within a predetermined range.

3. 5. 4. Impact Flux Booster 70

The impact flux booster 70 includes absolute value calculators 84 and 88, a coefficient outputter 85, a limiter 86, a multiplier 87, a divider 89, and an amplifier 90. The absolute value calculator 84 calculates the absolute value of the speed command ω*.

The coefficient outputter 85 outputs a coefficient $K_\omega$, which corresponds to the absolute value, |ω*| of the speed command ω*. When, for example, the absolute value |ω*| is smaller than a predetermined value $\omega_{th1}$, the coefficient $K_\omega$, is "0". When the absolute value |ω*| is equal to or larger than the predetermined value $\omega_{th1}$ and smaller than a predetermined value $\omega_{th2}$, the absolute value |ω*| is closer to "1" as the absolute value |ω*| is larger. When the absolute value |ω*| is equal to or larger than the predetermined value $\omega_{th2}$, the absolute value |ω*| is "1".

The limiter 86 limits the torque deviation ΔT within a predetermined range. For example, the limiter 86 refers to rated torque $T_{rate}$ and the torque command T*, and when T*>0 (which is at powering driving time) and ΔT<$T_{rate}$×0.1, the limiter 86 makes the torque deviation ΔT zero. When T*<0 (which is at regeneration driving time) and ΔT≥$T_{rate}$× 0. 1, the limiter 86 makes the torque deviation ΔT zero.

This enables the impact flux booster 70 to output, when the torque has increased, an impact flux boost adjustment value $\Delta\phi_{IMP}$ that corresponds to the torque deviation ΔT and to set, when the torque has decreased, the impact flux boost adjustment value $\Delta\phi_{IMP}$ at zero and output the zero impact flux boost adjustment value $\Delta\phi_{IMP}$. In a non-limiting embodiment, a hysteresis may be provided in the limiting operation of the limiter 86 in the state transition between the powering driving and the regeneration driving.

The multiplier 87 multiplies the torque deviation ΔT output from the limiter 86 by the coefficient $K_\omega$. This prevents the output of an impact flux boost adjustment value $\Delta\phi_{IMP}$ corresponding to the torque deviation ΔT when the speed command ω* is smaller than the predetermined value $\omega_{th1}$.

The absolute value calculator 88 calculates the absolute value of the product of the multiplication performed by the multiplier 87. The divider 89 divides, by the current amplitude $I_m$, the absolute value calculated by the absolute value calculator 88. In this manner, the amount of flux deficiency is calculated. The amplifier 90 includes the gain $K_{IMP}$ and makes the quotient of the division performed by the divider 89 $K_{IMP}$ times larger so as to generate the impact flux boost adjustment value $\Delta\phi_{IMP}$ ($=K_{IMP} \times (K_\omega \times \Delta T/I_m)$).

4. Processing of Generating Flux Command $\phi^*$

Figure 10:
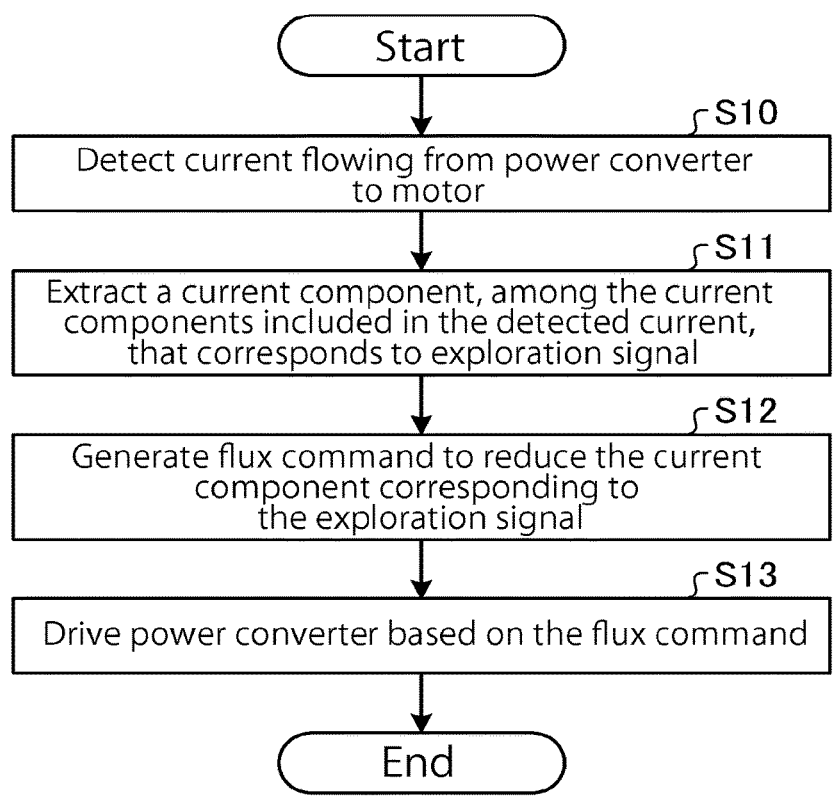
FIG. 10 is a flowchart of processing of generating a flux command.

Next, a flow of the processing of generating the flux command $\phi^*$ will be described. FIG. 10 is a flowchart of the processing of generating the flux command $\phi^*$. The processing of generating the flux command $\phi^*$ is repeated by the motor controller 1.

As illustrated in FIG. 10, the current detector 11 detects the output current $i_o$, which indicates the phase currents flowing from the power converter 10 through the U phase, the V phase, and the W phase of the motor 3 (step S10). The controller 12 extracts a current component, among the current components included in the output current $I_o$, that corresponds to the exploration signal $\phi_h$ (step S11).

The controller 12 generates the flux command $\phi^*$ to reduce the current component corresponding to the exploration signal $\phi_h$ (step S12). The controller 12 drives the power converter 10 based on the generated flux command $\phi^*$ (step S13).

The flux command generator 26 extracts the amplitude $I_{mh}$ of the current $I_{mh}$ and regards the amplitude $I_{mh}$ as the current component corresponding to the exploration signal $\phi_h$. Then, the flux command generator 26 generates the flux command $\phi^*$ to reduce the amplitude $i_{mh}$. This configuration, however, should not be construed in a limiting sense. Any other configuration is possible insofar as the flux command generator 26 is capable of generating the flux command $\phi^*$ to reduce the current $i_{mh}$ eventually. A possible alternative is to extract the current $i_{mh}$ instead of the amplitude $I_{mh}$ of the current $i_{mh}$ and generate the flux command $\phi^*$ reduce the current $i_{mh}$.

The flux command generator 26 subtracts the flux correction amount $\Delta\phi_{MTPA}$ from the base flux command $\phi_{rate}'$ so as to generate the flux command $\phi_{MTPA}$. Another possible configuration is not to use the base flux command $\phi_{rate}'$ and to regard the flux correction amount $\Delta\phi_{MTPA}$ as the flux command $\phi_{MTPA}$.

As described above, the flux command generator 26 includes the MTPA stopping controller 44, the anti-windup controller 67, and the impact flux booster 70. These elements may not necessarily be provided depending on the type of the motor 3 or operation environments.

In the above-described embodiment, the flux command $\phi^*$ is output from the flux command generator 26 to the voltage command calculator 27. Another possible embodiment is that the $\alpha\beta$ axis flux command $\phi_{\alpha\beta}^*$ is output from the flux command generator 26 to the voltage command calculator 27. In this case, the flux command generator 26 solves Formulae (1) and (2), described above.

Thus, the motor controller 1 according to this embodiment includes the driver 18, the current detector 11, and the flux command generator 26 (which is an example of the command generator). The driver 18 drives the power converter 10 based on the flux command $\phi^*$, on which the exploration signal $\phi_h$ is superimposed. The current detector 11 detects the output current output from the power converter 10 driven by the driver 18. The flux command generator 26 generates the flux command $\phi^*$ to reduce a current component of the current $i_{mh}$ that corresponds to the exploration signal $\phi_h$ (a non-limiting example of the current component is the amplitude $I_{mh}$ of the current $i_{mh}$) among the current components included in the output currents $i_u$, $i_v$, and $i_w$ (examples of the output current detected) detected by the current detector 11. This enables the motor controller 1 to perform a higher-efficiency operation without the need for knowing in advance the characteristics of the motor 3.

The flux command generator 26 includes the exploration component extractor 40 (which is a non-limiting example of the extractor recited in the appended claims) and the flux command calculator 41 (which is a non-limiting example of the calculator recited in the appended claims). The exploration component extractor 40 extracts a current component of the current $i_{mh}$ included in the output current $i_o$ detected by the current detector 11 (a non-limiting example of the current component is the amplitude $I_{mh}$ of the current $I_{mh}$). The flux command calculator 41 calculates the flux command $\phi^*$ to reduce the current component of the current $i_{mh}$ extracted by the exploration component extractor 40. Thus, a current $i_{mh}$ corresponding to the exploration signal $\phi_h$ is extracted. This configuration ensures accuracy in higher-efficiency operation.

The flux command calculator 41 calculates the flux command $\phi^*$ to make zero the current component of the current $i_{mh}$ extracted by the exploration component extractor 40. Making zero the current component of the current $i_{mh}$ corresponding to the exploration signal $\phi_h$ minimizes the current relative to the generated torque T, resulting in higher accuracy and higher efficiency in the operation of the motor.

The flux command calculator 41 includes the base command generator 45, the correction amount generator 46, and the corrector 47. The base command generator 45 generates the base flux command $\phi_{rate}'$, which serves as a basis for the flux command $\phi^*$. Based on the current component of the current $I_h$ extracted by the exploration component extractor 40, the correction amount generator 46 generates the flux correction amount $\Delta\phi_{MTPA}$ to reduce the current $i_{mh}$. The corrector 47 corrects the base flux command $\phi_{rate}'$ based on the flux correction amount $\Delta\phi_{MTPA}$ so as to generate the flux command $\phi^*$. Based on the base flux command $\phi_{rate}'$, which serves as a basis for the flux command $\phi^*$, the flux command $\phi^*$ is reduced where necessary considering the load. This configuration eliminates or minimizes a deficiency in flux at the start of control of the motor 3, for example.

The base command generator 45 uses the lowpass filter 64 to perform lowpass filter processing with respect to the rated flux $\phi_{rate}$ (which is a non-limiting example of the "original command set in advance" recited in the appended claims) so as to generate the base flux command $\phi_{rate}'$. Performing the lowpass filter processing causes primary delay to be generated, and thus eliminates or minimizes the current at the activation time.

The correction amount generator 46 includes the integrator 69. The integrator 69 integrates the current component of the current $i_{mh}$ extracted by the exploration component extractor 40 (for example, the amplitude $I_{mh}$ of the current $i_{mh}$) so as to generate the flux correction amount $\Delta\phi_{MTPA}$. This configuration ensures that the generated flux correction amount $\Delta\phi_{MTPA}$ is suitable for reducing the current component.

The motor controller 1 according to this embodiment includes the speed controller 23 (which is a non-limiting example of the torque command generator recited in the appended claims) and the torque estimator 16. The speed controller 23 generates the torque command $T^*$. The torque estimator 16 obtains the estimated torque $T\hat{\,}$, which is an estimated value of the output torque T of the power converter 10. The correction amount generator 46 includes the impact flux booster 70 (which is a non-limiting example of the adjustor recited in the appended claims). The impact flux booster 70 adjusts the flux correction amount $\Delta\phi_{MTPA}$ based on the difference $\Delta T$ between the torque command T* and the estimated torque T^. This configuration enables the flux to be changed rapidly in response to, for example, a rapid change in load, and thus ensures higher accuracy and higher efficiency in the operation of the motor.

The impact flux booster 70 adjusts the flux correction amount $\Delta\phi_{MTPA}$ based on a quotient of the difference $\Delta T$, between the torque command T* and the estimated torque T^, divided by the amplitude $i_m$ of the output current $i_o$. This ensures higher accuracy in changing the flux when, for example, a rapid change occurs in load.

Thus, the motor controller 1 includes the "power converter to generate a current that is based on a flux command on which an exploration signal is superimposed and to cause the current to flow through the motor" and the "means for generating a flux command to reduce the current flowing from the power converter based on a current component, among the current components included in the current, that corresponds to the exploration signal". The power converter 10 is a non-limiting example of the "power converter to generate a current that is based on a flux command on which an exploration signal is superimposed and to cause the current to flow through the motor". The flux command generator 26 is a non-limiting example of the "means for generating a flux command to reduce the current flowing from the power converter based on a current component, among the current components included in the current, that corresponds to the exploration signal".

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by the letters patent of the United States is:

1. A motor controller comprising:
   a driver configured to drive a power converter based on a flux command on which an exploration signal is superimposed;
   a current detector configured to detect an output current output from the power converter that has been driven by the driver; and
   command generator circuitry configured to generate the flux command such that the flux command reduces a. current component, among current components included in the output current detected by the current detector, that corresponds to the exploration signal,
   wherein the command generator circuitry is further configured to
   extract the current component corresponding to the exploration signal,
   generate the flux command such that the extracted current component is reduced,
   generate a base command that serves as a basis for the flux command,
   based on the current component extracted, generate a flux correction amount to reduce the current component extracted, and
   correct the base command based on the flux correction amount to generate the flux command.

2. The motor controller according to claim 1. wherein the command generator circuitry is configured to generate the flux command to make the extracted current component zero.

3. The motor controller according to claim 1, wherein the command generator circuitry is further configured to perform lowpass filter processing with respect to an original command set in advance to generate the base command.

4. The motor controller according to claim 1, wherein the command generator circuitry is further configured to integrate the extracted current component to generate the flux correction amount.

5. The motor controller according to claim 1, further comprising:
   torque command generator circuitry configured to generate a torque command; and
   torque estimator circuitry configured to estimate an output torque output from the power converter,
   wherein the command generator circuitry is further configured to adjust the flux correction amount based on a difference between the torque command and the torque estimated by the torque estimator circuitry.

6. The motor controller according to claim 5, wherein the command generator circuitry is further configured to adjust the flux correction amount based on a quotient of the difference, between the torque command and the torque estimated by the torque estimator circuitry, divided by an amplitude of the output current.

7. The motor controller according to claim 3, wherein the command generator circuitry further configured to integrate the extracted current component to generate the flux correction amount.

8. The motor controller according to claim 2, further comprising:
   torque command generator circuitry configured to generate a torque command; and
   torque estimator circuitry configured to estimate an output torque output from the power converter,
   where in the command generator circuitry is further configured to adjust the flux correction amount based on a difference between the torque command and the torque estimated by the torque estimator circuitry.

9. The motor controller according to claim 3, further comprising:
   torque command generator circuitry configured to generate a torque command; and
   torque estimator circuitry configured to estimate an output torque of from the power converter
   wherein the command generator circuitry is further configured to adjust the flux correction amount based on a difference between the torque command and the torque estimated by the torque estimator circuitry.

10. The motor controller according to claim 4, further comprising:
    torque command generator circuitry configured to generate a torque command; and
    torque estimator circuitry configured to estimate an output torque output from the power converter,
    wherein the command generator circuitry is further configured to adjust the flux correction amount based on a difference between the torque command and the torque estimated by the torque estimator circuitry.

11. The motor controller according to claim 8, wherein the command generator circuitry is further configured to adjust the flux correction amount based on a quotient of the difference, between the torque command and the torque estimated by the torque estimator circuitry, divided by an amplitude of the output current.

12. The motor controller according to claim 9, wherein the command generator circuitry is further configured to adjust the flux correction amount based on a quotient of the difference, between the torque command and the torque estimated by the torque estimator circuitry, divided by an amplitude of the output current.

13. The motor controller according to claim 10, wherein the command generator circuitry is further configured to adjust the flux correction amount based on a quotient of the difference, between the torque command and the torque estimated by the torque estimator circuitry, divided by an amplitude of the output current.

* * * * *